United States Patent [19]

Morishita et al.

[11] Patent Number: 4,569,411

[45] Date of Patent: Feb. 11, 1986

[54] POWER STEERING CONTROL APPARATUS

[75] Inventors: Mitsuharu Morishita; Shinichi Kouge, both of Himeji, Japan

[73] Assignee: Mitsubishi Denki Kabushiki Kaisha, Tokyo, Japan

[21] Appl. No.: 664,416

[22] Filed: Oct. 24, 1984

[30] Foreign Application Priority Data

Oct. 25, 1983 [JP] Japan .................. 58-166316[U]

[51] Int. Cl.$^4$ .............................. B62D 5/06
[52] U.S. Cl. .................................. 180/142
[58] Field of Search .............. 180/142, 143, 79.1

[56] References Cited

U.S. PATENT DOCUMENTS

| 3,820,619 | 6/1974 | Ezoe et al. | 180/142 |
| 4,392,540 | 7/1983 | Michio et al. | 180/142 |
| 4,476,529 | 10/1984 | Nakamura et al. | 180/142 |

FOREIGN PATENT DOCUMENTS 56-146473  11/1981  Japan .
57-178972  11/1982  Japan .
58-188751  11/1983  Japan .

Primary Examiner—Joseph F. Peters, Jr.
Assistant Examiner—Donn McGiehan
Attorney, Agent, or Firm—Leydig, Voit & Mayer Ltd.

[57] ABSTRACT

A power steering control apparatus for a car in which, under normal conditions, the steering becomes heavy as the speed of the car increases for the purpose of safety. This is realized by means of a hydraulic valve controlled by the reaction oil pressure of a proportional solenoid in the steering mechanism. In an abnormal condition such as the shortcircuit between solenoid coils or the failure of an electric control circuit, the conduction current of the proportional solenoid is interrupted by the electric control circuit whereby the reaction oil pressure is increased to cause the steering to become heavy. This function is performed by a failsafe circuit in the electric control circuit which monitors the error between the car speed inverse proportional signal and a feedback signal from the solenoid and then holds the abnormal condition when the error exceeds a predetermined value.

11 Claims, 5 Drawing Figures

POWER STEERING CONTROL APPARATUS

BACKGROUND OF THE INVENTION

This invention relates to a power steering control apparatus used for an automobile etc., and in particular to a power steering control apparatus for improving safety during high speed running upon the occurrence of an abnormal condition at least in a current feedback loop and capable of preventing a secondary failure.

Generally, it is required that a power steering control apparatus for an automobile reduce (lighten) the manual steering power required in proportion to the steering load while increasing the manual steering power required in proportion to the car speed so as to make the steering operation safe during high speed running.

For this, it has been generally followed in such power steering control apparatus that the coils of a proportional solenoid have flowing therethrough current in proportion to a car speed via electrical wiring within the car from an electrical control system in the car, thereby providing a proper hydraulic reaction force for a steering the car by actuating a hydraulic valve in approximate proportion to said flowing current.

However, disadvantages arise when a failure of the proportional solenoid or the electrical wiring gives rise to a shortcircuit between the coils, a ground fault a shortcircuit between the wiring lines, or when a closed loop for current control within the electrical control system fails, resulting in the dissapearance of a current detection signal so that no current control can be performed. Therefore, excessive current flows through the coils of the proportional solenoid so that the coils may be over-heated and burned, or a power transistor in a solenoid driving circuit may be broken down. Also, since the driver can steer the handle too lightly during high speed running, the manual steering operation becomes unstable so that the driver feels uneasy, resulting in a disadvantageous and dangerous condition.

Japanese Patent Application Laid-open No. 58-188751 discloses a protection circuit in which a chopper circuit for driving a power steering motor is disconnected in the event that an input/output signal line for an angular sensor serving for the reciprocal rotation of a power steering motor is broken.

Japanese Patent Application Laid-open No. 56-146473 discloses a power steering control apparatus in which an output power transistor is prevented from being destroyed, overheated, or burned even when a linear solenoid as a load is shorted and the wiring is grounded, while a steering condition is maintained at a low speed.

Japanese Patent Application Laid-open No. 57-178972 discloses a speed sensitive power steering apparatus in which when a change gear selects a gear position other than that of the first gear and the reverse gear, the absence of a car speed signal is detected for a failsafe operation.

SUMMARY OF THE INVENTION

The present invention has been made to solve the above problem with conventional apparatus.

It is accordingly an object of the invention to provide a power steering control apparatus capable of maintaining stable steering condition during a high speed running as well as preventing a secondary failure of the proportional solenoid and the electrical control system.

Briefly in this invention for the above object, when a closed loop for current control fails, the conduction current through the proportional solenoid is interrupted until a key switch is turned off, whereby a steering hydraulic reaction force is held at an increased level which causes the steering apparatus to be safe.

The present invention broadly resides in a power steering control apparatus comprising a car speed sensor, a power source, an electric control circuit connected to the car speed sensor and the power source, and a proportional solenoid, responsive to the output of the electric control circuit, for providing a steering reaction oil pressure; the electric control circuit including: first means for producing a command signal in inverse proportion to the output of the car speed sensor; second means for detecting a current signal flowing through the proportional solenoid; third means for comparing the command signal with the current signal as a feedback signal to develop an error signal therebetween; fourth means for developing from the error signal a driving signal for the proportional solenoid; fifth means, responsive to the error signal, for detecting a predetermined abnormal condition and holding the abnormal condition; and, sixth means, responsive to the output of the fifth means, for passing the electrical energy from the power source to the fourth means in the normal condition while interrupting the electrical energy to the fourth means in the predetermined abnormal condition.

Preferably, the fifth means comprises an integration portion for integrating the error signal from the error amplification circuit, a comparing portion for comparing the integrated voltage of the integration portion with a reference voltage corresponding to the predetermined abnormal detective signal and for providing as an output therefrom a signal indicating the abnormal condition, and a holding portion for holding the integrated voltage of the integration portion in the abnormal condition.

BRIEF DESCRIPTION OF THE DRAWINGS

The present invention will be readily apparent from the accompanying drawings in which.

It is to be noted that throughout the figures the same reference numerals designate identical or corresponding portions.

DETAILED DESCRIPTION OF THE PREFERRED EMBODIMENT

Figure 1:
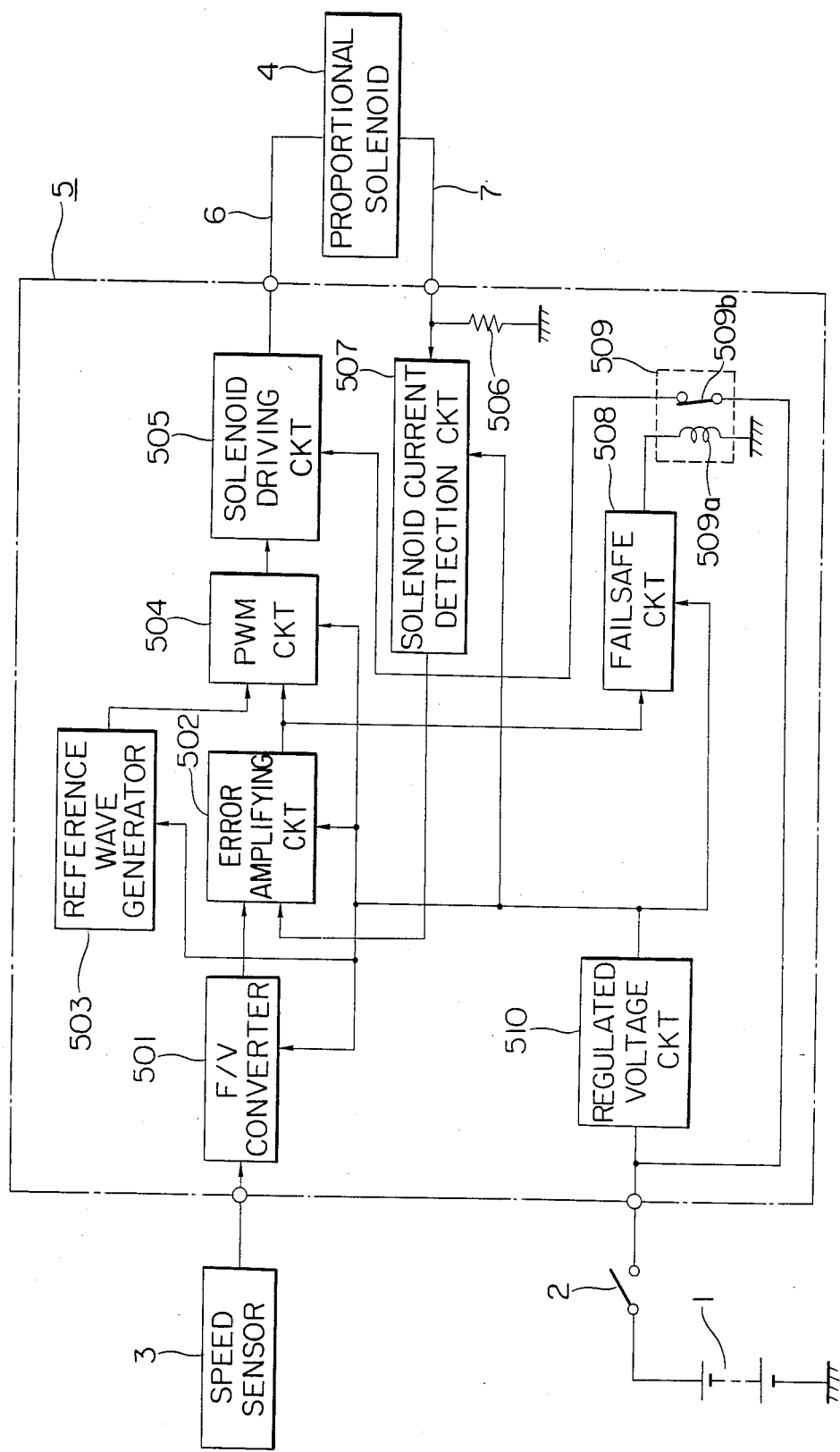
FIG. 1 shows a schematic block diagram of one preferred embodiment of a power steering control apparatus according to the present invention.

Referring now to the drawings, particularly to FIG. 1, one preferred embodiment of a power steering control apparatus according to this invention is shown. Only the essential elements are shown.

In the figure, the positive terminal of a DC battery 1 mounted on a car is connected to one terminal of a key switch 2 and the negative terminal thereof is grounded. The other terminal of the key switch 2 and a car speed sensor 3 are electrically connected to a proportional solenoid 4 through an electric control circuit 5. The speed sensor 3 may be of the type which uses pulses of a speed meter of a lead-switch or a transistor type. The proportional solenoid 4 controls a hydraulic valve (not shown), for providing a reaction oil pressure for a steering mechanism, in proportion to the level of its conduction current. The electric control circuit 5 receives as an input an electrical power from the battery 1 through the key switch 2, receives as an input a speed signal from the sensor 3, and consequently provides as an output therefrom a current signal in inverse proportion to the car speed, thereby to drive the proportional solenoid 4.

The electrical control circuit 5 is composed of a frequency/voltage (F/V) converter 501, an error amplifying circuit 502, a reference wave generator 503, a pulse width modulation (PWM) circuit 504, a proportional solenoid driving circuit 505, a shunt resistor 506, a solenoid current detection circuit 507, a failsafe circuit 508, a protection relay 509 including a coil 509a and a normally closed contact 509b, and a regulated voltage circuit 510.

Figure 2:
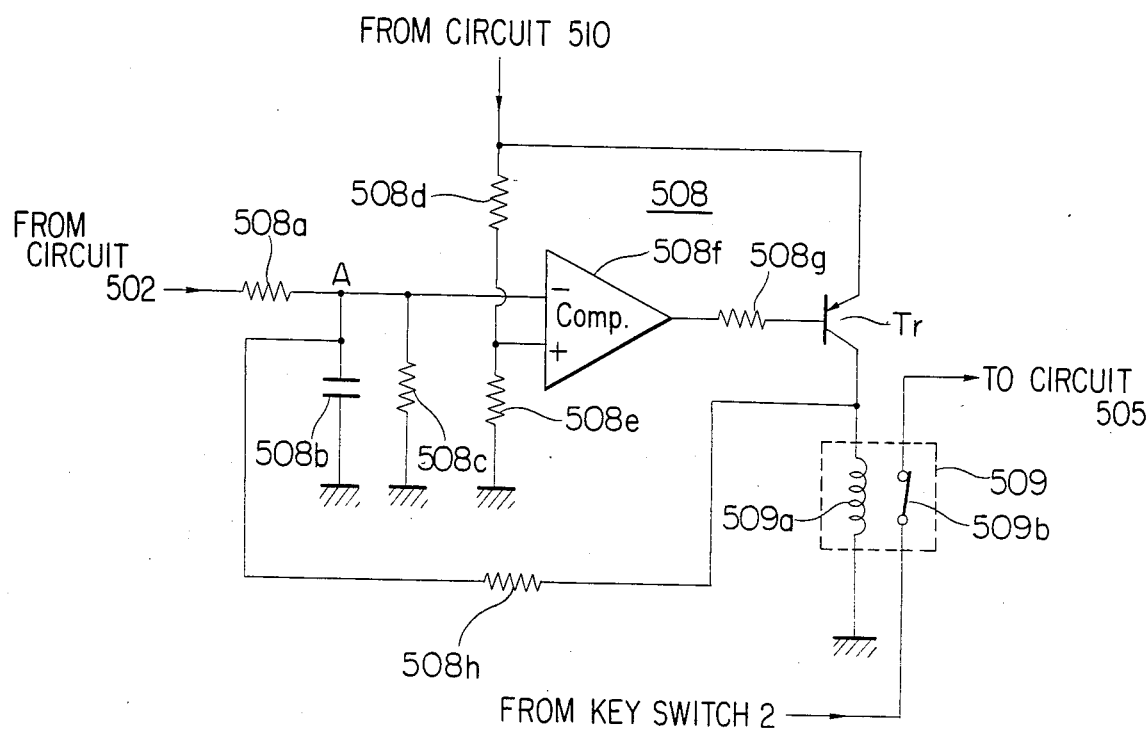
FIG. 2 shows a detailed circuit diagram of the failsafe circuit employed in the power steering control apparatus shown in FIG. 1; and, FIGS. 3A–3C show various characteristic curves used for explaining the operation of the power steering control apparatus shown in FIG. 1.

The details of the failsafe circuit are shown in FIG. 2. In the figure, one terminal of a resistor 508a is connected to the output terminal of the error amplifying circuit 502 and the other terminal thereof is connected to a capacitor 508b, the combination of the resistor 508a and the capacitor 508b forming a delay (integration) circuit. Across the capacitor 508b is connected a resistor 508c which serves as a discharging resistor for the capacitor 508b after the integration has been completed. The junction of the resistor 508a, the capacitor 508b, and the resistor 508c is connected to the inverting input of a comparator 508f the non-inverting input of which is connected to the junction of voltage dividing resistors 508d and 508e. The other ends of the capacitor 508b, the resistor 508c, and the resistor 508e are grounded. The non-inverting input of the comparator 508f is set to a reference voltage determined by the dividing resistors 508d and 508e. The output of the comparator 508f is connected through a resistor 508g to the base of a transistor Tr the collector of which is connected through the relay coil 509a of the protection relay 509 to ground. The junction of the collector of the transistor Tr and the coil 509a is connected through a resistor 508h to the junction of the resistor 508a and the capacitor 508b to form a holding circuit.

The F/V converter 501 converts the frequency of pulses from the sensor 3 into a reverse-proportional voltage. The error amplifying circuit 502 compares the output voltage, as a reference, of the F/V converter 501 which corresponds to a car speed and the output voltage of the detection circuit 507 which corresponds to the current flowing through the proportional solenoid 4, and amplifies the error. The oscillation circuit 503 generates a triangular wave signal or a saw tooth wave signal at a reference frequency (500–1000 Hz) which is used to develop a pulse width modulated-wave voltage from the PWM circuit 504. This PWM circuit 504 compares the output voltages of the error amplifying circuit 502 and the reference wave generator 503, and modulates the output waveform of the reference wave generator 503 by the varying output voltage of the error amplifying circuit 502. The solenoid driving circuit 505 responds to the PWM voltage out of the circuit 504 to control a driving current via line 6 for the proportional solenoid 4. The shunt resistor 506 is connected between the output 7 of the proportional solenoid 4 and ground to detect a driving current. The solenoid current detection circuit 507 detects the voltage drop across the resistor 506 and feeds a voltage corresponding to the driving current of the solenoid 4 back to the error amplifying circuit 502. The failsafe circuit 508 integrates the output voltage of the error amplifying circuit 502 by the resistor 508a and the capacitor 508b shown in FIG. 2, the integrated voltage being discharged by the resistor 508c after the completion of the integration, and activates the coil 509a of the protection relay 509 in the event that the output voltage of the error amplifying circuit 502 does not reach zero during a period longer than a predetermined time interval (for example, 0.1–0.5 seconds) which is determined by the relationship between the time constant of the combination of the resistor 508a and the resistor 508b and the reference voltage of the non-inverting input of the comparator 508f. In other words, unless the error between the output voltage corresponding to the car speed and the output voltage of the solenoid current detection circuit 507 disappears, the comparator 508f provides as an output therefrom a low level voltage to switch on the transistor Tr to continuously energize the coil 509a of the protection relay 509 to break the normally closed contact 509b whereby the electrical power of the battery 1 as a power source is interrupted to the proportional solenoid driving circuit 505 through the key switch 2 and the normally closed contact 509b. Otherwise, the proportion solenoid driving circuit 505 is energized through the closed contact 509b. The regulated voltage circuit 510 supplies from the battery 1 through the key switch 2 a predetermined constant voltage (about 5–8 V) necessary for all of the circuits but the circuit 505 in the electric control circuit 5.

It is to be noted that the line 6 forms the positive line of the electrical wiring of a car while the line 7 forms the negative line thereof.

The operation of the power steering control apparatus shown in FIGS. 1 and 2 according to this invention will now be described with reference to FIG. 3.

Figure 3A:
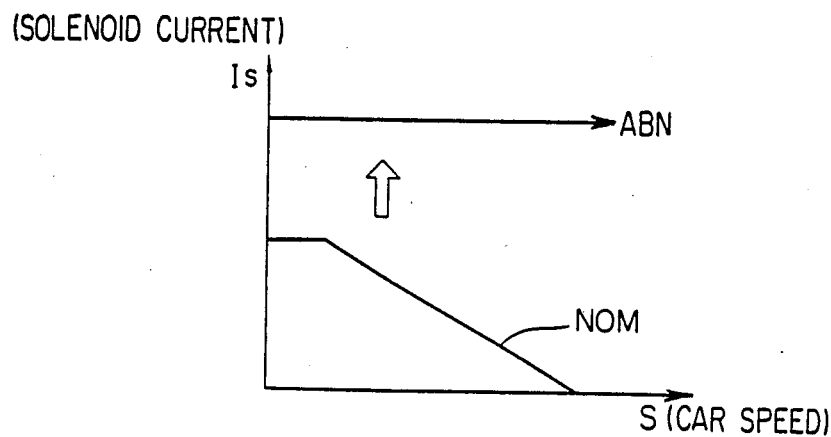
Figure 3B:
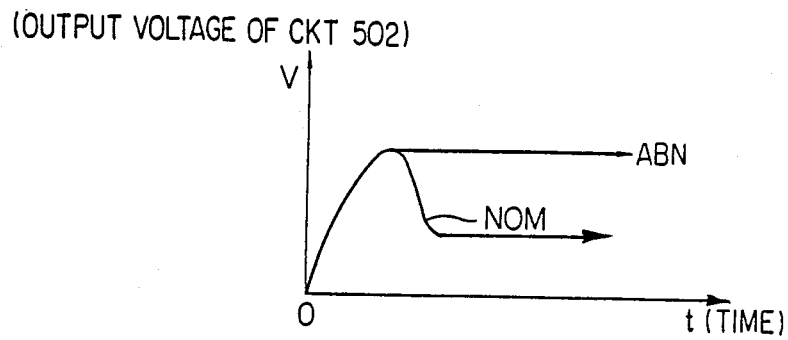
Figure 3C:
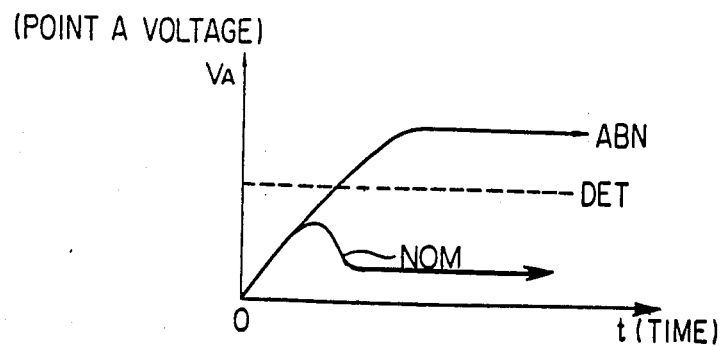

FIG. 3A shows a current characteristic (Is) of the proportional solenoid 4 as a function of a car speed (s), FIG. 3B shows an output voltage characteristic (V) of the error amplifying circuit 502 as a function of time (t), and FIG. 3C shows a voltage characteristic ($V_A$) at point A in the failsafe circuit 508 shown in FIG. 2 as a function of time (t). In FIG. 3, curves NOM and ABN denote a normal condition and an abnormal condition, respectively, and DET denotes an abnormal condition detective level determined by the reference input of the comparator 508f of the circuit 508.

In the normal condition of the error amplifying circuit 502, the PWM circuit 504, the proportional solenoid driving circuit 505, the line 6, the proportional solenoid 4, the line 7, the shunt resistor 506, and the solenoid current detection circuit 507 which form a closed loop, current corresponding to a command (reference) voltage, corresponding to a car speed, provided by the F/V converter 501 is supplied to the solenoid 4 with being controlled by this feedback loop at a constant value as generally illustrated by the left portion of the curve NOM in FIG. 3A. As the car speed increases, the solenoid current Is decreases as illustrated by the right portion of the curve NOM in FIG. 3A whereby the handling of the steering of the car becomes heavy at this time for the purposes of safety.

Then, when the car speed decreases and so the command voltage of the F/V converter 501 becomes high in reverse proportion to the car speed, the error between the outputs of the circuits 501 and 507 appears.

Since the error is amplified and integrated by the error amplifying circuit 502 with a very large gain, the output voltage V of the error amplifying circuit 502 gradually increases as shown by the left half of the normal characteristic curve NOM in FIG. 3B. Meanwhile, the conduction current of the proportional solenoid 4 also increases so that the feedback voltage out of the solenoid current detection circuit 507 follows i.e. increases correspondingly, whereby the output voltage V of the error amplifying circuit 502 oppositely decreases as shown by the right half of the normal characteristic curve NOM in FIG. 3B and is then brought to an equilibrium value determined by the output of the converter 501 at a car speed according to which the equilibrium value is variable.

Accordingly, the voltage $V_A$ at point A of the failsafe circuit 508 assumes the normal characteristic curve NOM shown in FIG. 3C similar to the curve NOM in FIG. 3A. Namely, the input voltage $V_A$ of the comparator 508f increases but decreases and is then brought to an equilibrium state before it attains the abnormal condition detective level DET of the reference input level of the comparator 508f indicated by dotted lines and hence the failsafe circuit 508 provides no output voltage therefrom so that the output of the comparator 508f is at a high voltage level to switch off the transistor Tr and therefore the contact 509a of the protection relay 509 is kept closed, thereby applying a normal voltage to the proportional solenoid driving circuit 505 and maintaining the normal operation.

In the abnormal event of the PWM 504, the proportional solenoid driving circuit 505, the shunt resistor 506, and the solenoid current detection circuit 509 in the above-noted closed loop, or of the shortcircuit between the coil wires or the coil layers of the solenoid 4, or of the ground fault of the solenoid 4, the feedback voltage to the error amplifying circuit 502 from the detection circuit 507 which corresponds to the current actually flowing through the solenoid 4 disappears so that the error of the output voltage of the detection circuit 507 with respect to the command voltage corresponding to the car speed from the F/V converter 501 becomes large, whereby the output voltage V of the error amplifying circuit 502 assumes the abnormal characteristic ABN shown in FIG. 3B. Since the error amplifying circuit 502 indefinitely provides as an output therefrom a high voltage nevertheless the feedback voltage does not increase correspondingly, the error voltage of the circuit 502 does not decrease but will continue to provide as an output therefrom a high voltage as shown in FIG. 3B.

Therefore, the voltage characteristic ($V_A$) at point A of the failsafe circuit 508 assumes the abnormal curve ABN shown in FIG. 3C wherein as the above noted predetermined time interval (0.1–0.5 seconds) lapses, the level of the inverting input of the comparator 508f exceeds the level of the non-inverting input (reference input) which is set to the abnormal condition detective level DET. Namely, the predetermined time interval (0.1–0.5 seconds) corresponds to the time interval from t=0 to the cross point of the curves ABN and DET. Therefore, the output of the comparator 508f becomes low so that the transistor Tr is switched on to energize the coil 509a of the protection relay 509. At this moment when the collector of the transistor Tr becomes high, the inverting input (or point A) of the comparator 508f is fixed to the same high level, thereby holding the switch-on state of the transistor Tr and therefore the energization of the coil 509a. This holding state is kept until the key switch 2 is turned off.

The energization of the coil 509a breaks the contact 509b so that the electrical power source of the proportional solenoid driving circuit 505 and in turn the proportional solenoid 4 is interrupted, resulting in a heavy steering condition corresponding to a high speed running condition for the purposes of safety.

Thus the driver's uneasy feeling and the dangerous condition due to an unstable steering condition due to an excessive light steering condition during a high speed running is eliminated.

Also when the feedback voltage disappears due to the ground fault of the negative wiring 7, the shortcircuit of the shunt resistor 506, and the failure of the solenoid current detection circuit 507 etc., the error amplifying circuit 502 continues to provide a certain output so that the solenoid current characteristic as a function of the car speed assumes the abnormal curve ABN shown in FIG. 3A in which a higher current is caused as compared with the normal condition. Therefore, the proportional solenoid 4 can be prevented from being overheated and burned by the actuation of the protection relay 509 whereby the occurrence of the secondary failure is avoided.

According to this invention, when a current control closed loop fails, the conduction current of the solenoid is interrupted whereby a heavy steering condition is maintained for the purpose of safety, by means of a simple arrangement. This ensures a safe driving condition of a car during a high speed running and prevents the proportional solenoid and the electrical control system from being subjected to a secondary failure.

It is be noted that although the present invention has been described along the above embodiment shown in the accompanying drawings, it should not be limited to the described embodiment but various modifications are possible without departing from the spirit of this invention.

What we claim as a patent is:

1. A power steering control apparatus comprising a car speed sensor, a power source, an electric control circuit connected to said car speed sensor and said power source, and a proportional solenoid, responsive to the output of said electric control circuit, for providing a steering reaction oil pressure;
    said electric control circuit including:
    first means for producing a command signal in inverse proportion to the output of said car speed sensor;
    second means for detecting a current signal flowing through said proportional solenoid;
    third means for comparing said command signal with said current signal as a feedback signal to develop an error signal therebetween;
    fourth means for developing from said error signal a driving signal for said proportional solenoid;
    fifth means, responsive to said error signal, for detecting a predetermined abnormal condition and holding said abnormal condition; and,
    sixth means, responsive to the output of said fifth means, for passing the electrical energy from said power source to said fourth means in the normal condition while interrupting said electrical energy to said fourth means in said predetermined abnormal condition.

2. A power steering control apparatus as claimed in claim 1 wherein said first means comprises a frequency-voltage converter which converts the speed signal from said car speed sensor into a corresponding voltage in inverse proportion to said speed signal.

3. A power steering control apparatus as claimed in claim 2 wherein said second means comprises a shunt resistor connected to the output of said solenoid and ground, and a solenoid current detection circuit for detecting the voltage across said shunt resistor corresponding to the solenoid current.

4. A power steering control apparatus as claimed in claim 3 wherein said third means comprises an error amplifying circuit for comparing said command signal from said frequency-voltage converter with the output voltage of said solenoid current detection circuit as a feedback signal and for developing an error signal therebetween.

5. A power steering control apparatus as claimed in claim 4 wherein said fourth means comprises a reference wave generator, a pulse width modulation circuit for modulating the reference wave from said generator with said error signal from said error amplifying circuit to develop a PWM wave voltage, and a proportional solenoid driving circuit for receiving the electrical energy from said power source through said fifth means to develop a driving current for said solenoid through an electrical wiring in the car.

6. A power steering control apparatus as claimed in claim 1 wherein said fifth means comprises an integration portion for integrating said error signal from said error amplification circuit, a comparing portion for comparing the integrated voltage of said integration portion with a reference voltage corresponding to said predetermined abnormal detective signal and for providing as an output therefrom a signal indicating the abnormal condition, and a holding portion for holding the integrated voltage of said integration portion in said abnormal condition.

7. A power steering control apparatus as claimed in claim 5 wherein said fifth means comprises an integration portion for integrating said error signal from said error amplification circuit, a comparing portion for comparing the integrated voltage of said integration portion with a reference voltage corresponding to said predetermined abnormal detective signal and for providing as an output therefrom a signal indicating the abnormal condition, and a holding portion for holding the integrated voltage of said integration portion in said abnormal condition.

8. A power steering control apparatus as claimed in claim 7 wherein said integration portion includes a first resistor and a capacitor, said comparing portion includes second and third voltage dividing resistors and a comparator for comparing the integrated voltage with the divided reference voltage and providing as an output therefrom a logic signal in the abnormal condition, and said holding portion includes a transistor the base of which is connected to the output of said comparator, the collector of which is connected through said sixth means to ground and connected to the output of said integration portion, and the emitter of which is connected to said power source.

9. A power steering control apparatus as claimed in claim 8, further including a fourth resistor for discharging the integrated voltage of said integration portion.

10. A power steering control apparatus as claimed in claim 9 wherein said sixth means comprises a protection relay having a relay coil connected between the collector of said transistor and ground and having a normally closed contact connected between said power source and said solenoid driving circuit.

11. A power steering control apparatus as claimed in claim 10, further comprising a key switch connected between said normally closed contact and said power source.

* * * * *